(12) United States Patent
Reynolds et al.

(10) Patent No.: US 6,746,087 B1
(45) Date of Patent: Jun. 8, 2004

(54) ELECTRONIC EQUALIZING RESERVOIR CONTROLLER WITH PNEUMATIC PENALTY OVERRIDE

(75) Inventors: John M. Reynolds, Copenhagen, NY (US); D. Mark Pettit, LaFargeville, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/437,079

(22) Filed: May 14, 2003

(51) Int. Cl.[7] .............................................. B60T 13/00
(52) U.S. Cl. ........................ 303/15; 303/3; 303/20; 303/16; 303/18
(58) Field of Search .......................... 303/3, 7, 15, 20, 303/128, 40, 86, 118.1, 33, 18, 16–17; 701/19–20, 70

(56) References Cited

U.S. PATENT DOCUMENTS

| | | | | |
|---|---|---|---|---|
| 3,623,777 A | * | 11/1971 | Sarbach et al. | 303/9 |
| 3,782,782 A | * | 1/1974 | Brown | 303/19 |
| 4,491,372 A | * | 1/1985 | Walley | 303/18 |
| 4,830,437 A | * | 5/1989 | Rumsey | 303/18 |
| 4,971,399 A | * | 11/1990 | Balukin et al. | 303/33 |
| 5,020,862 A | * | 6/1991 | Balukin et al. | 303/15 |
| 5,172,316 A | | 12/1992 | Root et al. | |
| 6,036,284 A | | 3/2000 | Pettit et al. | |
| 6,318,811 B1 | | 11/2001 | Root et al. | |
| 6,371,575 B1 | | 4/2002 | Lewis et al. | |

* cited by examiner

Primary Examiner—Douglas C. Butler
(74) Attorney, Agent, or Firm—Barnes & Thornburg LLP

(57) ABSTRACT

A control system which allows electro-pneumatic control of an equalizing reservoir with the capacity to create penalty applications in a purely pneumatic manner. A controller for the equalizing reservoir includes an electro-pneumatic source of pressure or atmosphere responsive to an electrical equalizing pressure control signal and a pilot valve selectively connecting the electro-pneumatic source or atmosphere to the equalizing reservoir in response to pressure in a pilot port of the first pilot valve. A magnetic valve is provided having a first input connected to a second source of pressure, a second input connected to atmosphere and an output connected to the pilot port of the first pilot valve. At least one penalty valve is connected to the pilot input of the first pilot valve and is responsive to a penalty signal to connect the pilot input to atmosphere. The pilot valve and the penalty valve pneumatically produce a brake application regardless of the state of the magnetic valve or its controller.

24 Claims, 2 Drawing Sheets

ELECTRONIC EQUALIZING RESERVOIR CONTROLLER WITH PNEUMATIC PENALTY OVERRIDE

BACKGROUND AND SUMMARY OF THE INVENTION

The present system relates generally to brake control systems and more specifically to a controller for an equalizing reservoir of a rail brake system, which includes a brake pipe controlled by a relay valve in response to pressure in the equalizing reservoir.

Prior rail brake systems have had either fully-pneumatic control of the equalizing reservoir (ER) or electro-pneumatic control of the ER. On systems which use fully-pneumatic ER control, penalty brake applications were created by exhausting a previously pressurized penalty pipe. This caused a subsequent pneumatic exhaust of the ER and brake application. On systems which use electro-pneumatic ER control, penalty brake applications are signaled to the brake system by electrical signals. The ER is then reduced to apply the brakes via electro-pneumatic control. Prior brake systems including ER controllers are illustrated in U.S. Pat. Nos. 6,036,284 and 6,318,811.

The present control system allows electro-pneumatic control of ER but with the capacity to create penalty applications in a purely pneumatic manner. A controller for an ER includes an electro-pneumatic source of pressure or atmosphere responsive to an electrical equalizing pressure control signal and a pilot valve selectively connecting the electro-pneumatic source or atmosphere to the equalizing reservoir in response to pressure in a pilot port of the first pilot valve. A magnetic valve is provided having a first input connected to a second source of pressure, a second input connected to atmosphere and an output connected to the pilot port of the first pilot valve. At least one penalty valve is connected to the pilot input of the first pilot valve and is responsive to a penalty signal to connect the pilot input to atmosphere.

The one or more penalty valves may be connected to the pilot port of the first pilot valve via the first input of the magnetic valve or may be connected to the pilot port of the first pilot valve at the output of the magnetic valve. The penalty valves are responsive to an electric penalty signal or a pneumatic penalty signal. One or more of the penalty valves may be connected to the pilot port of the first pilot valve by a suppression or second pilot valve which selectively disconnects the penalty valve from the pilot port in response to a suppression signal. A pilot port of the second pilot valve may either be controlled by a second magnetic valve or by a pneumatic source of a suppression signal.

These and other aspects of the present invention will become apparent from the following detailed description of the invention, when considered in conjunction with accompanying drawings.

DETAILED DESCRIPTION OF THE PREFERRED EMBODIMENTS

Figure 1:
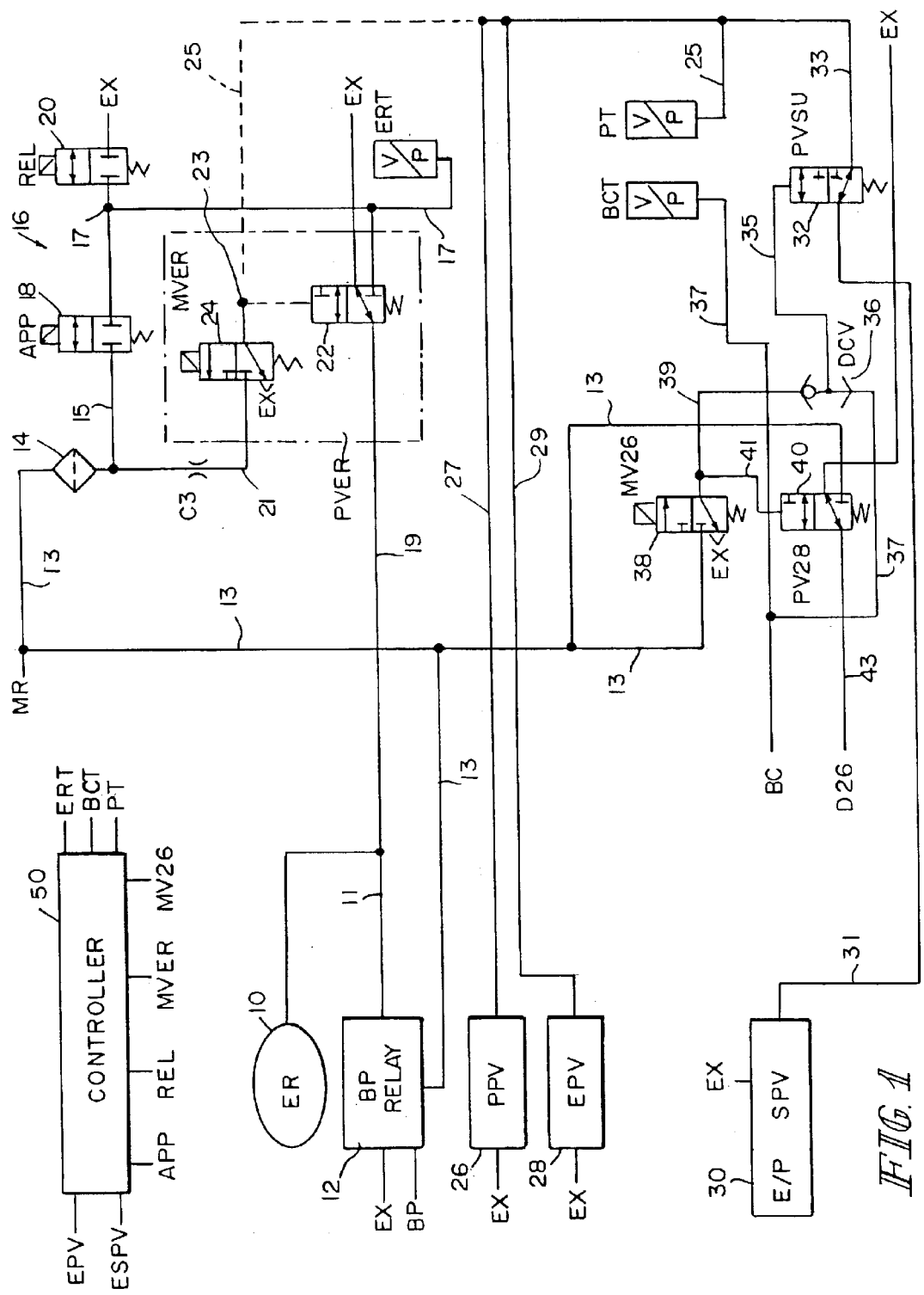
FIG. 1 is a schematic of a controller for an equalizing reservoir showing a first embodiment of the present invention.
Figure 2:
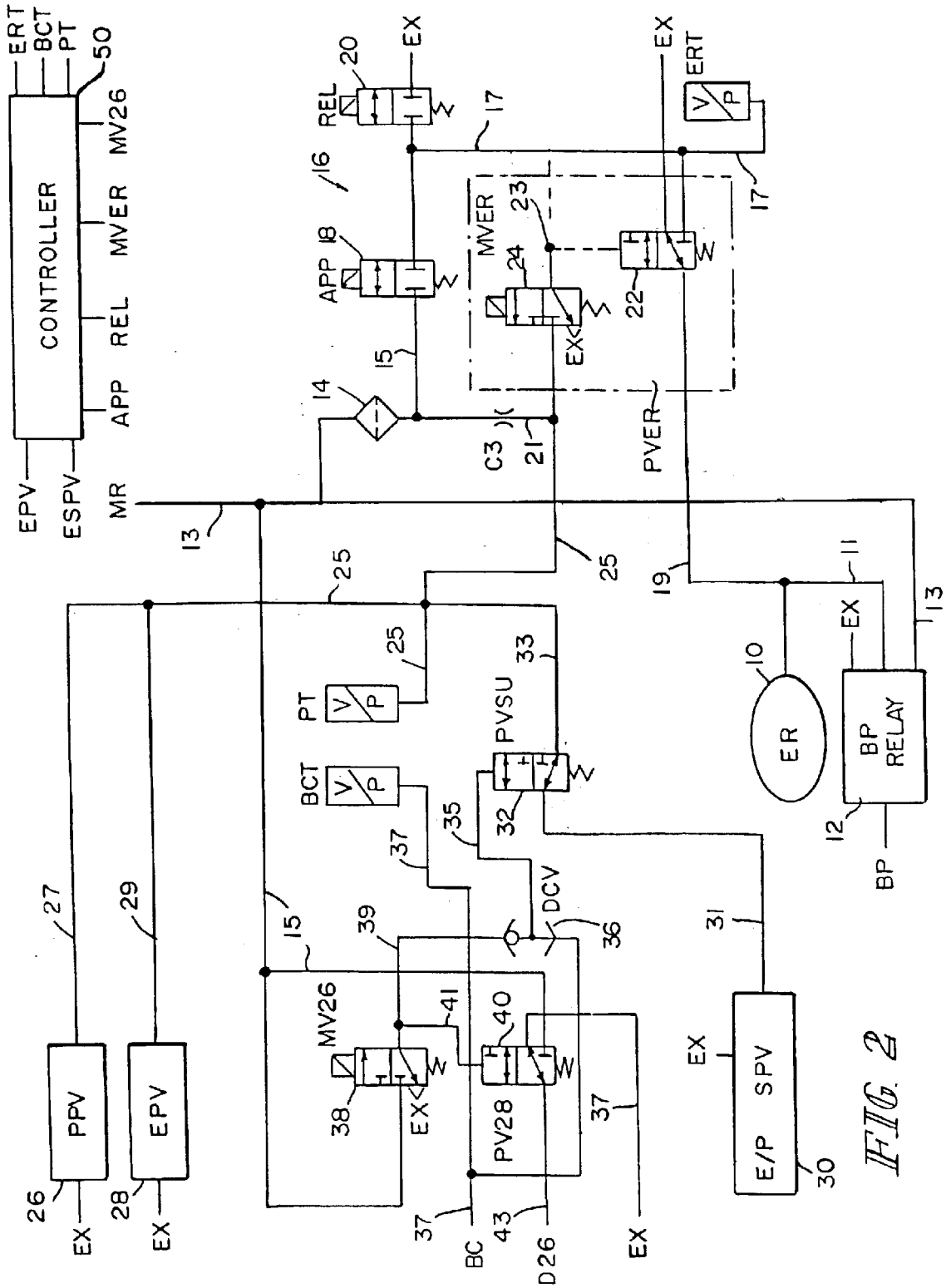
FIG. 2 is a schematic of a controller for an equalizing reservoir illustrating a second embodiment of the present invention.

FIGS. 1 and 2 show two embodiments of a controller for an equalizing reservoir. All of the elements are the same. The difference is in the connection of the penalty valve system to the equalizing reservoir control pilot valve. The controller for the equalizing reservoir is only part of a train brake control system, as illustrated in the previously mentioned patents. This equalizing controller may be used with systems other than those illustrated in the aforementioned patents.

As shown in the figures, an equalizing reservoir (ER) 10 is connected to and controls a brake pipe relay 12 via line 11. The brake pipe relay 12 controls a brake pipe (BP). Also, connected to the brake pipe relay 12 is exhaust (EX) and main reservoir (MR) via line 13. As is well known, the brake pipe relay 12 receives a reference signal 11 from the ER 10 and produces an appropriate pressure in the brake pipe (BP) using exhaust (EX) and pressure from the main reservoir (MR) via line 13. Reduction in the pressure in the ER 10 produces a reduction in the pressure in the brake pipe (BP), which reflects a brake application. An increase in the pressure in ER 10 creates an increase in the pressure in brake pipe (BP), which is a brake release signal. The brake pipe cut off and charging circuit have been deleted for sake of clarity. How this is accomplished is well-known, as illustrated in the abovementioned patents.

The main reservoir (MR) is also connected via line 13 and filter 14 to an electro-pneumatic source of pressure or atmosphere 16, which is responsive to an electrical equalizing pressure control signal. An electro-pneumatic or magnetic apply valve 18 and an electro-pneumatic or magnetic release valve 20 are shown connected together at a common output 17. The input to the release valve 20 is exhaust (EX), and the input to the apply valve 18 is from the output of the filter 14 via line 15. Even though a pair of valves 18 and 20 are shown in the electro-pneumatic source of pressure or atmosphere 16, a single valve may be used or any other electro-pneumatic control system to provide a desired equalizing reservoir pressure signal. The output 17 is connected to an equalizing reservoir transducer (ERT).

The output 17 is also provided as a first input to the equalizing reservoir pilot valve (PVER) 22. The other input is from atmosphere or exhaust (EX). The output of the PVER 22 is provided on line 19 to the ER 10. The pilot port or pilot line 23 of valve 22 is connected to an electro-pneumatic or magnetic valve 24. A second pressure source at the input of 24 on line 21 is from the main reservoir (MR) and filter 14 through a choke or restriction C3. As will he explained below, the restriction C3 prevents the charging of the pilot port 23 when the penalty valve connects the pilot port 23 to exhaust (EX) or atmosphere.

The equalizing magnetic valve (MVER) 24 is shown in its deactivated condition, wherein the pilot port 23 is connected to exhaust (EX). Upon activation, the source is connected to the pilot valve 22 to move it from its shown exhaust position to its control pressure position connecting its output 19 to line 17. The control of the apply valve 18 and release valve 20 determine the pressure provided through the open pilot valve 22 to the ER 10. These connections and operations are well known in the prior art, as shown in the previously discussed patents.

Also, connected to pilot port 23 of the PVER 22 are pneumatic penalty valve 26 and electric or electro-pneumatic penalty valve 28 via lines 27 and 29 to penalty pilot line 25. The pneumatic penalty valve 26 may be an operator-activated valve or deadman's valve, pedal valve or other various safety valves within the locomotive. The electric penalty valve 28 may be other valves activated by the locomotive control system in response to a penalty condition. Both of the valves 26 and 28 are responsive to a penalty input signal to connect their respective output lines 27 and 29 and, consequently, penalty pilot line 25 to exhaust (EX). This removes the pilot signal from pilot port 23 of the PVER 22 causing it to return to the shown position connecting its output 19 and the ER 10 to atmosphere or exhaust (EX). This causes the brake pipe relay 12 to reduce the brake pipe pressure causing a brake application. It should be noted that penalty valves 26 and 28 are connected directly to penalty pilot line 25 and, therefore, are considered non-suppressible in that they will automatically cause a brake application.

An electro-pneumatic suppressible penalty valve (SPV) 30 is also connected to penalty pilot line 25 via line 31 and suppression pilot valve (PVSU) 32 and its output 33. The PVSU 32 is responsive to a pilot signal 35 to disconnect its input or SPV 30 from its output and, consequently, control of the pilot port 23 of the PVER 22. Typical examples of suppressible penalty valves are operator-activated valves, dead man's valves, pedal valves or other safety valves. The pressure value in the penalty pilot line 25 to pilot port 23 is monitored by a pressure transducer (PT). This may be used in controlling the ER 10 using the electro-pneumatic source 16 and indicates that a penalty valve has been activated connecting the penalty pilot line 25 to exhaust (EX).

The penalty valves 26, 28 and 32 are merely examples and may be electric, electro-pneumatic or pneumatic. The number of valves may be varied. The point is that there are one or more non-suppressible penalty valves and one or more suppressible penalty valves.

The pilot port 35 of PVSU 32 is connected to the higher of two signals from double-check valve (DCV) 36. One input to the DCV 36 is from the brake cylinder (BC) via line 37. A brake cylinder transducer (BCT) is also provided. The other input to the DCV 36 is from a magnetic or electro-pneumatic valve (MV26) 38. The input to the MV26 magnetic valve 38 is from the main reservoir (MR) via line 13. The MV26 magnetic valve 38 is shown in its deactivated condition providing atmosphere as its input to the DCV 36. Normally, the brake cylinder is released, and its input to DCV 36 is also at atmosphere. Thus, the PVSU 32 is in its position shown connecting the SPV 30 to penalty pilot line 25. If brakes are applied and there is pressure in the brake cylinder (BC), DCV 36 will provide pilot pressure on pilot port 35 of the PVSU 32 activating it to disconnect the SPV 30 from the output 33 and penalty pilot line 25.

In response to a suppression electric signal, the MV26 magnetic valve 38 will be activated moving from the shown position connecting the main reservoir (MR) via lines 13 and 39 to the DCV 36. This provides pressure on pilot port 35 of the PVSU 32, again disconnecting the SPV 30 from line 33 and penalty pilot line 25. One source of electric signal to activate the MV26 magnetic valve 38 would be the automatic brake handle. Brake handle positions of suppress and above would cause an activation of MV26 magnetic valve 38. These positions, as is well known, are Suppression, Handle Off and Emergency brake application. Other control signals may be provided to the MV26 magnetic valve 38 to suppress or cut off the SPV 30 from controlling the penalty pilot line 25.

An added feature to provide feedback of the condition position of the MV26 magnetic valve 38 is the use of PV26 pilot valve 40. Its pilot port 41 is connected to the output of the MV26 magnetic valve 38. The PV26 pilot valve 40 is shown in its unpiloted position wherein its output 43 is connected to exhaust (EX). When MV26 magnetic valve 38 moves to its suppression mode, pressure pilot port 41 moves PV26 pilot valve 40 to its second position connecting the main reservoir (MR) via line 13 to its output 43. This output signal D26 is provided back to a control or an event recorder.

A controller 50 is provided. This controller provides all of the control signals to the various electro-pneumatic or magnetic valves and receives feedback from each of the transducers. Controller 50 is illustrated as a single block and may be the controller of the brake system, which may be a single controller or may be plural distributive controllers. Portions of the controller 50 may be on a module, which includes the controller for the ER 10 with other portions of the controller 50 being part of a system controller. Controller 50 is also shown controlling the electro-pneumatic penalty valves. Again, this would generally be performed by the brake system controller versus a distributive controller portion of the ER 10.

FIG. 2 includes all of the same elements as FIG. 1. The difference is that the penalty pilot line 25 is not connected at the output of the MVER magnetic valve 24, as in FIG. 1, but is connected to the input 21 of the MVER magnetic valve 24. The non-suppressible penalty valves 26, 28 are still connected directly to the penalty pilot line 25, and the suppressible penalty valve 30 is connected through PVSU piloted suppression valve 32.

When MVER magnetic valve 24 is not activated, exhaust is connected to pilot line 23 of the PVER valve 22 thus connecting its output 19 and ER 10 to exhaust (EX). This would produce the same results whether one of the penalty valves is activated or not. When MVER magnetic valve 24 is activated connecting its input 21 to the pilot line 23, main reservoir pressure is provided on the pilot valve 23 connecting its output 19 to the electro-pneumatic source of pressure 16. The penalty valves 26, 28 and 30 control the penalty pilot line 25 at the input of MVER valve 24. When one of the penalty valves is activated, line 25 is connected to atmosphere bringing down the input to MVER valve 24 and, consequently, the pilot port 23 of PVER valve 22.

Thus, the operation of the systems in FIGS. 1 and 2 are the same. Both provide a pneumatic actuated braking in response to a penalty condition whether it is an electro-pneumatically or pneumatically sensed penalty. The primary advantage of embodiment 1 is that it allows the controller to prevent a continuous exhaust of MR out of an open penalty valve. The controller can detect a penalty condition via PT and act to de-energize (close) MVER valve 24, thereby preventing any further exhaust of air. This also prevents a continuous exhaust of air when the controller (and magnetic valve 24) are in a powered off condition. This would allow an unpowered locomotive to be hauled unmanned with an open foot valve, for instance.

Although the present invention has been described and illustrated in detail, it is to be clearly understood that this is done by way of illustration and example only and is not to be taken by way of limitation. The scope of the present invention is to be limited only by the terms of the appended claims.

What is claimed:

1. A controller for an equalizing reservoir of a rail brake system which includes a brake pipe controlled by a relay valve in response to pressure in the equalizing reservoir, the controller comprising:

an electro-pneumatic source of pressure or atmosphere responsive to an electrical equalizing pressure control signal;

a first pilot valve selectively connecting the electro-pneumatic source or atmosphere to the equalizing reservoir in response to pressure in a pilot port of the first pilot valve;

a magnetic valve having a first input connected to a second source of pressure, a second input connected to atmosphere and an output connected to the pilot port of the first pilot valve; and a penalty valve connected to the pilot input of the first pilot valve and responsive a penalty signal to connect the pilot input to atmosphere.

2. The controller according to claim 1, wherein the second source of pressure includes a restriction to prevent the charging of the pilot port when the pilot port is connected to atmosphere by the penalty valve.

3. The controller according to claim 1, wherein the penalty valve is connected to the pilot port of the first pilot valve via the first input of the magnetic valve.

4. The controller according to claim 1, wherein the penalty valve is connected to the pilot port of the first pilot valve at the output of the magnetic valve.

5. The controller according to claim 1, wherein the penalty valve is responsive to at least one of an electric penalty signal and a pneumatic penalty signal.

6. The controller according to claim 1, including at least a first and a second penalty valve each connected to the pilot input of the first pilot valve and responsive to a penalty signal to connect the pilot input to atmosphere; and wherein the first penalty valve is connected to the pilot port of the first pilot valve by a suppression valve which selectively disconnects the penalty valve from the pilot port in response to a suppression signal, and the second penalty valve is not connected via the suppression valve.

7. The controller according to claim 1, wherein the penalty valve is connected to the pilot port of the first pilot valve by a suppression valve which selectively disconnects the penalty valve from the pilot port in response to a suppression signal.

8. The controller according to claim 7, wherein the suppression valve is responsive to at least one of an electric suppression signal and a pneumatic suppression signal.

9. The controller according to claim 8, wherein the electric suppression signal is a function of a position of a brake handle controller.

10. The controller according to claim 7, wherein the suppression valve is a pilot valve receiving a pneumatic suppression signal from the larger of a pneumatic source signal or an electro-pneumatic source signal.

11. The controller according to claim 7, wherein the suppression valve is a pilot valve receiving a pneumatic suppression signal from at least one of a pneumatic source or an electro-pneumatic source.

12. The controller according to claim 11, wherein the pneumatic source of the pneumatic suppression signal is brake cylinder pressure.

13. The controller according to claim 1, including a pressure transducer connected to the pilot port of the first pilot valve and used for one of control of the magnetic valve and an indication of an open to atmosphere penalty valve.

14. A controller for an equalizing reservoir of a rail brake system which includes a brake pipe controlled by a relay valve in response to pressure in the equalizing reservoir, the controller comprising:

an electro-pneumatic source of pressure or atmosphere responsive to an electrical equalizing pressure control signal;

a first pilot valve selectively connecting the electro-pneumatic source or atmosphere to the equalizing reservoir in response to pressure in a pilot port of the first pilot valve;

a first magnetic valve having a first input connected to a second source of pressure, a second input connected to atmosphere and an output connected to the pilot port of the first pilot valve;

a second pilot valve having an output connected to the pilot port of the first pilot valve, an input and a pilot port responsive to a suppress signal to disconnect the second pilot valve's input and output;

a first penalty valve connected to the pilot port of the first pilot valve and responsive to a penalty signal to connect the pilot port to atmosphere;

a second penalty valve connected to the input of the second pilot valve and responsive to a penalty signal to connect the input of the second pilot valve to atmosphere; and a second magnetic valve having a first input connected to the second source of pressure and a second input connected to atmosphere and an output connected to and providing a suppress signal to the pilot port of the second pilot valve.

15. The controller according to claim 14, wherein including a restriction between the second source of pressure and the first input of the first magnetic valve to prevent the charging of the pilot port of the first pilot valve when the pilot port of the first pilot valve is connected to atmosphere by the penalty valves.

16. The controller according to claim 14, wherein the first penalty valve and the second pilot valve are connected to the pilot port of the first pilot valve via the first input of the first magnetic valve.

17. The controller according to claim 14, wherein the first penalty valve and the second pilot valve are connected to the pilot port of the first pilot valve at the output of the first magnetic valve.

18. The controller according to claim 14, wherein the penalty valves are responsive to at least one of an electric penalty signal and a pneumatic penalty signal.

19. The controller according to claim 14, wherein the second pilot valve is responsive to at least one of an electric suppression signal and a pneumatic suppression signal.

20. The controller according to claim 19, wherein the electric suppression signal is a function of a position of a brake handle controller.

21. The controller according to claim 14, wherein the second pilot valve receives a pneumatic suppression signal from the larger of a pneumatic source signal or an electro-pneumatic source signal.

22. The controller according to claim 14, wherein the second pilot valve receives a pneumatic suppression signal from at least one of a pneumatic source or an electro-pneumatic source.

23. The controller according to claim 22, wherein the pneumatic source of the pneumatic suppression signal is brake cylinder pressure.

24. The controller according to claim 14, including a pressure transducer connected to the pilot port of the first pilot valve and used for one of control of the first magnetic valve and an indication of an open to atmosphere penalty valve.

* * * * *